United States Patent [19]
Hebert

[11] 4,209,920
[45] Jul. 1, 1980

[54] OYSTER DREDGING APPARATUS

[76] Inventor: Harold J. Hebert, P.O. Box 31, Erath, La. 70533

[21] Appl. No.: 920,449

[22] Filed: Jun. 29, 1978

[51] Int. Cl.$^2$ .............................................. E02F 5/00
[52] U.S. Cl. ........................................... 37/55; 43/8
[58] Field of Search .................... 37/55, 119; 414/143; 43/102, 8, 6.5; 254/137, 175.5, 175.6, 175.7

[56] References Cited

U.S. PATENT DOCUMENTS

| | | | |
|---|---|---|---|
| 2,265,570 | 12/1941 | Nicol | 37/51 |
| 2,363,790 | 11/1944 | Herbert | 37/71 |
| 2,417,121 | 3/1947 | Nelson | 37/55 |
| 2,814,145 | 11/1957 | Fredericks | 43/8 |
| 3,465,901 | 9/1969 | Grabowski | 37/55 X |
| 3,608,217 | 9/1971 | Voisin, Sr. | 37/119 X |
| 3,831,311 | 8/1974 | Cushing | 43/6.5 |
| 3,974,923 | 8/1976 | Mark et al. | 43/8 X |
| 4,028,821 | 6/1977 | Hanks | 37/55 |

FOREIGN PATENT DOCUMENTS 792981 8/1968 Canada ................................ 43/102

*Primary Examiner*—Clifford D. Crowder
*Attorney, Agent, or Firm*—Llewellyn A. Proctor

[57] ABSTRACT

Apparatus for mounting on the deck of a vessel which is useful for dredging oysters or other marine animals from water bottoms which is comprised generally of the combination of (a) a dredge, (b) a tilt-frame with which the dredge is intimately associated in its function of lifting and dumping the contents of the dredge, after its retrieval from the water bottom, and (c) a conveyor, or conveyors, located below the tilt frame, the tilt frame being pivotally mounted above said conveyor, or conveyors, such that when the filled dredge is withdrawn from the water bottoms and rested upon the tilt-frame, the tilt frame will pivot and dump the contents of the dredge onto the conveyor, or conveyors, for transport to a location on the deck of the vessel for separation, assortment, grading or collection. Preferably, the dredge and tilt frame mechanisms are mounted on a portion of a conveyor which is extended over the edge of the deck of the vessel, and the extended portion of the conveyor is hinged to a fixed conveyor portion such that, when the dredge-tilt frame mechanism is not in operation, the end section of the conveyor which carries the dredge-tilt frame mechanisms can be hoisted, or raised above the deck of the vessel to facilitate movement of the vessel in canals, harbors, or other marine facilities.

10 Claims, 7 Drawing Figures

OYSTER DREDGING APPARATUS

The progress of biological research and food technology has produced rapid advancement of oyster farming during the last century. Thousands of acres of formerly barren sea bottoms have been converted to fertile underwater farms, the quality of oysters has been improved, and reliable methods have been developed for the preservation of oyster meat by canning, freezing and smoking.

Oyster farms are formed by the selection of suitable water bottoms, which are cleared of debris, maintained free of predators and, where necessary, reinforced with shells or gravel. Oyster farming includes planting adult oysters for breeding; scattering clean oyster or clam shells over the water bottom for the attachment of oyster larvae; transporting young oysters for use as seed to growing and maturing grounds; and harvesting.

Oysters, and other forms of shell fish, are commonly seeded and harvested by the use of large floating contrivances termed dredges, of which several types have been developed. One type of dredge utilizes a rigid, adjustable frame suspended from the vessel and upon which, when lowered by cable from the vessel into operating position, empty buckets descend along the underside of the frame and the loaded buckets ascend along the upper side of the frame. In another type of dredge, a rotating scraper is located in front of a rigid, adjustable frame and oysters are dug up and dislodged from the water bottom, and then transported via a screw, or endless belt conveyor mounted on the frame to the deck of the vessel. Hydraulic, or suction dredges are also used to harvest oysters, the oysters being drawn in admixture with water and other solids from the water bottom for deposit on the deck, or in the hold of the vessel. Perhaps one of the oldest types of dredge, and yet one of the most useful, is that wherein a scoop, or dredge, is lowered and dragged along the bottom to scrape oysters from the water bottom, raised via flexible cables suspended from a derrick, and then dumped upon the deck of the vessel. Some dredges of this type are operated with two lines, one line for opening the dredge so that the dredge can be dropped to the water bottom in open, biting position and thereafter closed by use of the second line when the filled dredge is pulled from the bottom. Usually, a single vessel employs a plurality of scoops, or dredges, of this type, one or a plurality of which are mounted on both the port and starboard sides of the vessel. The chief advantage of this type of dredge lies in its simplicity. And, the depth to which a dredge can reach is practically unlimited. The amount of operating labor required is perhaps the single, most adverse factor associated with the use of this latter type of dredge.

In operation of the dredge, one operative is required to pilot the vessel, and another to operate the scoop, or dredge. Others are required to manipulate and dump the oysters after the filled scoop, or dredge, has been pulled onto the deck of the vessel; and, additional labor is required to separate, sort out and size the oysters which are to be harvested. A reduction in the number of operators required to pilot the vessel and operate the scoops, or dredges, is greatly needed by the industry.

It is, accordingly, the primary objective of the present invention to supply this need, especially by providing new and novel oyster harvesting apparatus, particularly apparatus suitable for mounting on a vessel, inclusive of a scoop, or dredge, which can be lowered for dragging along the water bottom to collect oysters, filled, raised to the deck of the vessel, automatically dumped, and the harvested osyters then sorted out, conveyed and then piled for transport, or for use in seeding.

A particular object is to provide oyster harvesting apparatus which can be safely operated, simultaneously with the operation of the vessel, by a single operative, suitably by the same individual who pilots the vessel.

These objects and others are achieved in accordance with the present invention embodying improvements in dredging apparatus, particularly apparatus useful for dredging oysters or other marine animals from water bottoms. A preferred dredging apparatus is one mounted on the deck of a vessel which is comprised of (a) a scoop, dredge, or open container which is capable of being filled, and retaining materials scooped from a water bottom, (b) a tilt frame with which the scoop, or dredge is intimately associated in its function of lifting and dumping the contents of the dredge, after its retrieval from the water bottom, and (c) a conveyor, or conveyors, located below the tilt frame, the tilt frame being pivotally mounted above said conveyor, or conveyors, such that when the filled scoop, or dredge, is withdrawn from the water bottom and rested upon the tilt frame, the tilt frame will pivot and dump the contents of the dredge onto the conveyor, or conveyors, for transport to a location on the deck of the vessel for separation, assortment, grading or collection. In a preferred embodiment, the dredge and tilt frame mechanisms are mounted on a portion of a conveyor which is extended over the edge of the deck of the vessel, and the extended portion of the conveyor is hinged to a fixed conveyor portion such that, when the dredge-tilt frame mechanism is not in use in a dredging operation, the end section of the conveyor which carries the dredge-tilt frame mechanisms can be hoisted, or raised above the deck of the vessel to facilitate movement of the vessel in canals, harbours, or other marine facilities.

(a) In the most preferred apparatus combination the scoop, or dredge is constituted of a metal frame, usually a metal frame of oblong cross-section with a solid flat bottom, and solid side walls for support, and the rearward and upper sides of the metal frame are covered by a metal net. The forward, lower side of the dredge is provided with an array of downwardly faced teeth-like projections for biting into the soil at the water bottom, and draw means are provided for attachment of a chain by virtue of which the dredge can be lowered to the water bottom for dredging, lifted from the water bottom and rested upon, or stored within the tilt frame.

(b) The tilt frame is preferably constituted of a cage-like structure pivotally attached to a structure located above the conveyor, or attached to the conveyor itself. The tilt frame carries a pulley block through which a chain is passed, one end of which is attached to the dredge and the other of which is wound upon a windlass, such that the frame is titled forwardly when the dredge is lowered via the chain to the water bottom for dredging and filling, or as the filled dredge is raised to enter the cage but, after sufficient entry of the filled dredge into the cage the tilt frame pivots, and rotates rearwardly to discharge or dump its contents onto the conveyor, or conveyors.

(c) The conveyor transports the discharged contents from the dredge to another location for separation, assortment, grading or collection, or to another conveyor for eventual discharge upon the deck for subsequent separation, assortment, grading or collection. A preferred conveyor is one providing a hinged section which extends over the edge of the deck and carries the dredge-tilt frame mechanisms, the hinged section of the conveyor being capable of being elevated and secured in upright position above the deck of the vessel to facilitate movement of the vessel through canals, harbours, and other marine objects or installations.

The characteristics of a preferred dredging apparatus, and its principle of operation, will be more fully understood by reference to the following detailed description, and to the attached drawings to which reference is made in the subsequent description. Similar numbers are used in the different figures to represent similar parts or components, and subscripts are used with numbers where there is a plurality of similar components. Reference by use of a whole number to a component represented by a number in the description as having a plurality of similar components is intended in a generic sense.

Figure 1:
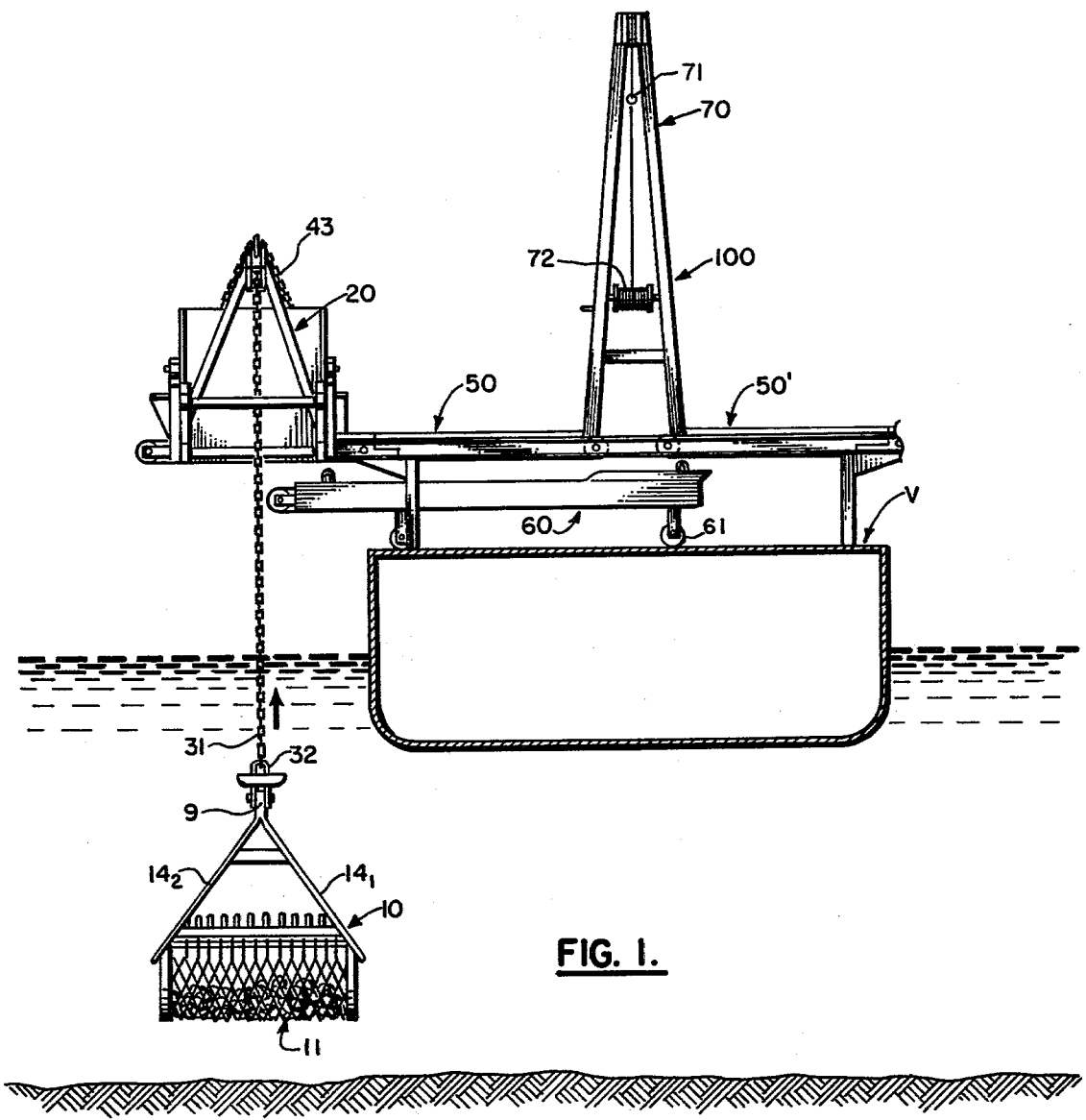
FIG. 1 depicts, in partial elevation view, a preferred dredge mechanism according to the present invention mounted on the forward deck of a motor vessel; a scoop, or dredge per se being shown on initiation of a lift, the dredge having been in lowered position for dredging oysters from a water bottom.
Figure 5:
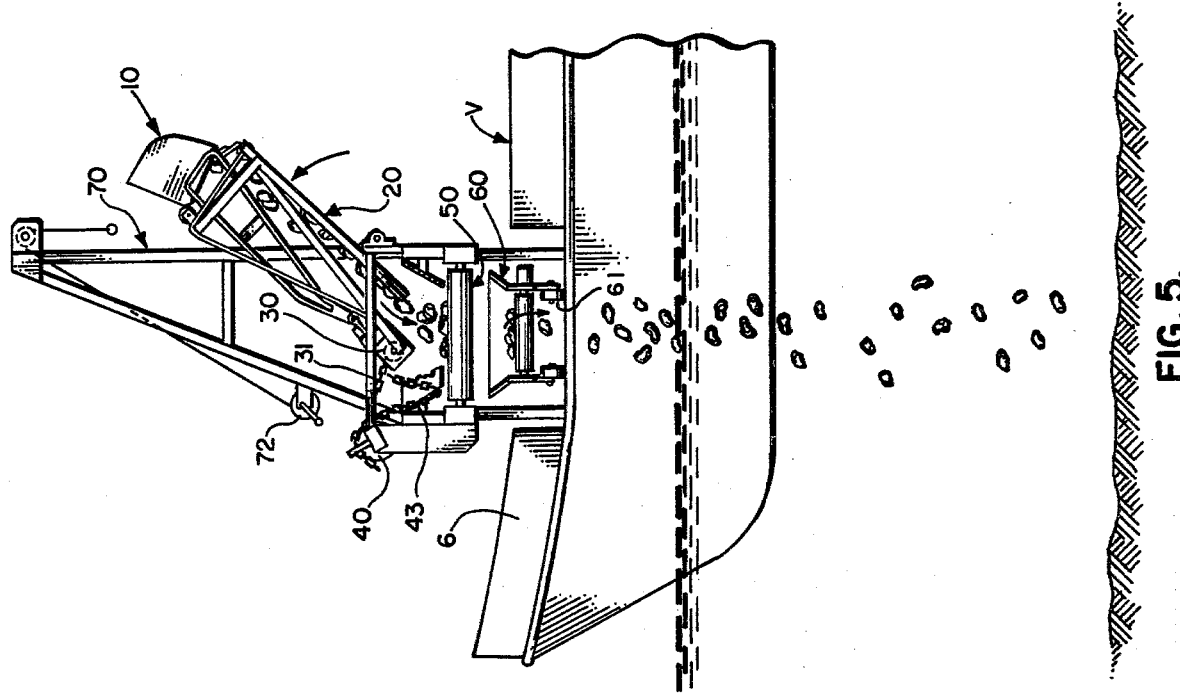
FIG. 5 depicts an automatic tilt, or dumping mechanism, for dumping oysters from a dredge, inclusive of a derrick, or mechanism used for lifting the dredge-tilt mechanism above the deck of the vessel.
Figure 3:
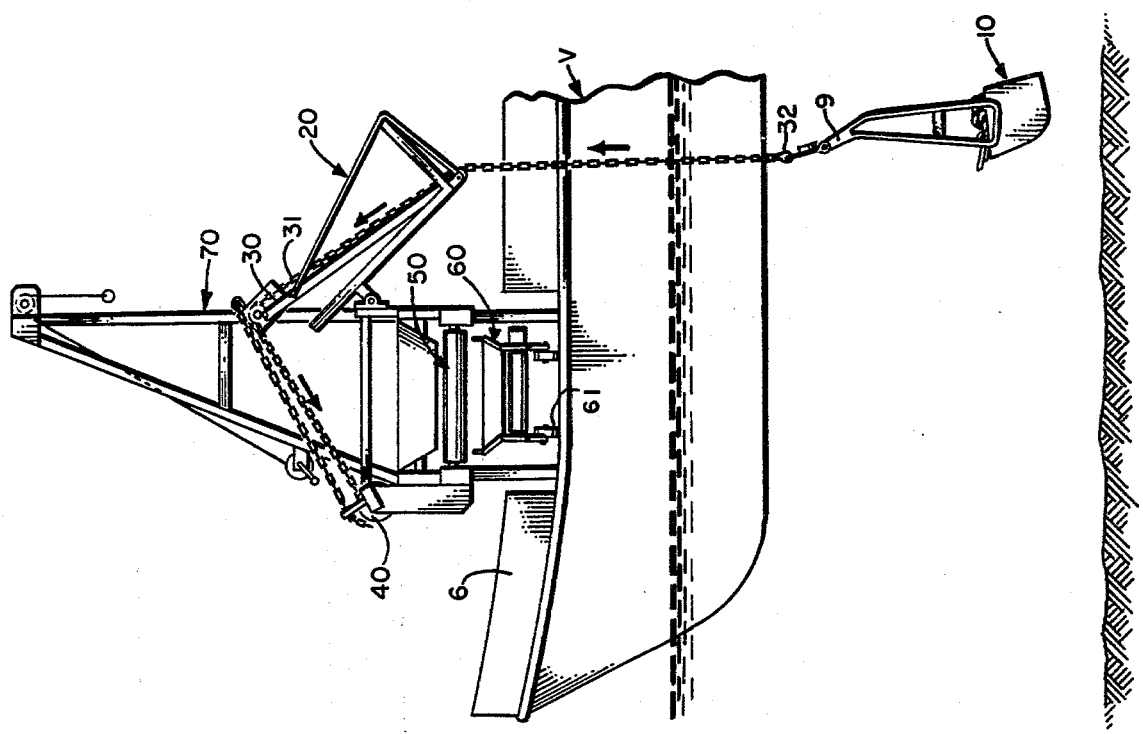
FIG. 3 depicts a partial elevation view of the dredge mechanism shown in FIG. 1, the scoop, or dredge per se having been filled with oysters and is in the position of being withdrawn to the surface.

Referring generally to the figures, notably FIGS. 1, 3 and 5, there is shown a boat, ship or motor vessel V, the aft end of which is provided with the usual crew quarters and pilot's cabin (not shown). The deck at the forward end of the vessel V is provided with dredging apparatus 100 which includes a scoop, or dredge per se 10, a tilt frame mechanism 20 with which the dredge 10 is intimately associated in its function of lifting and dumping oysters, a conveyor 50, and a derrick 70. A similar dredge 10', tilt frame mechanism 20' and conveyor 50', the former of which are not shown and the latter of which is shown only in part to avoid duplication, are mounted on the opposite side of the vessel, V. Oysters collected by dredges 10,10' are dumped upon conveyors 50,50' and transported to the center of the vessel, V, and then dispersed via the flexible conveyor 60. Thus, conveyors 50,50' are strategically located adjacent the points of discharge of dredges 10,10' (not shown) for transport of the collected oysters to a centralized location on the deck for separation, assortment, grading and collection of the oysters taken from the water bottom, or transferred from conveyors 50,50' to conveyor 60 to a collection point, or points, or dispersed for subsequent assortment, grading and collection. One or a plurality of the dredging mechanisms 100 are aligned along the length of the deck of a vessel, both the port and starboard sides of the vessel thus generally being provided with one or a plurality of dredge 10-tilt frame 20 mechanisms, with their associated conveyors 50,50' and conveyor 60. A derrick 70 is employed to lift a dredge 10-tilt frame 20 mechanism and a dredge 10'-tilt frame 20' mechanism to a position above the deck of the vessel, a portion of a conveyor 50,50' being hinged so that said mechanisms can be secured above deck while the vessel V is underway, and not engaged in an oyster dredging operation. The lift feature provides compactness, and eliminates a safety hazard as when it is necessary for the vessel to pass through canals, harbours, beneath bridges, or near other vessels and marine facilities.

Figure 4:
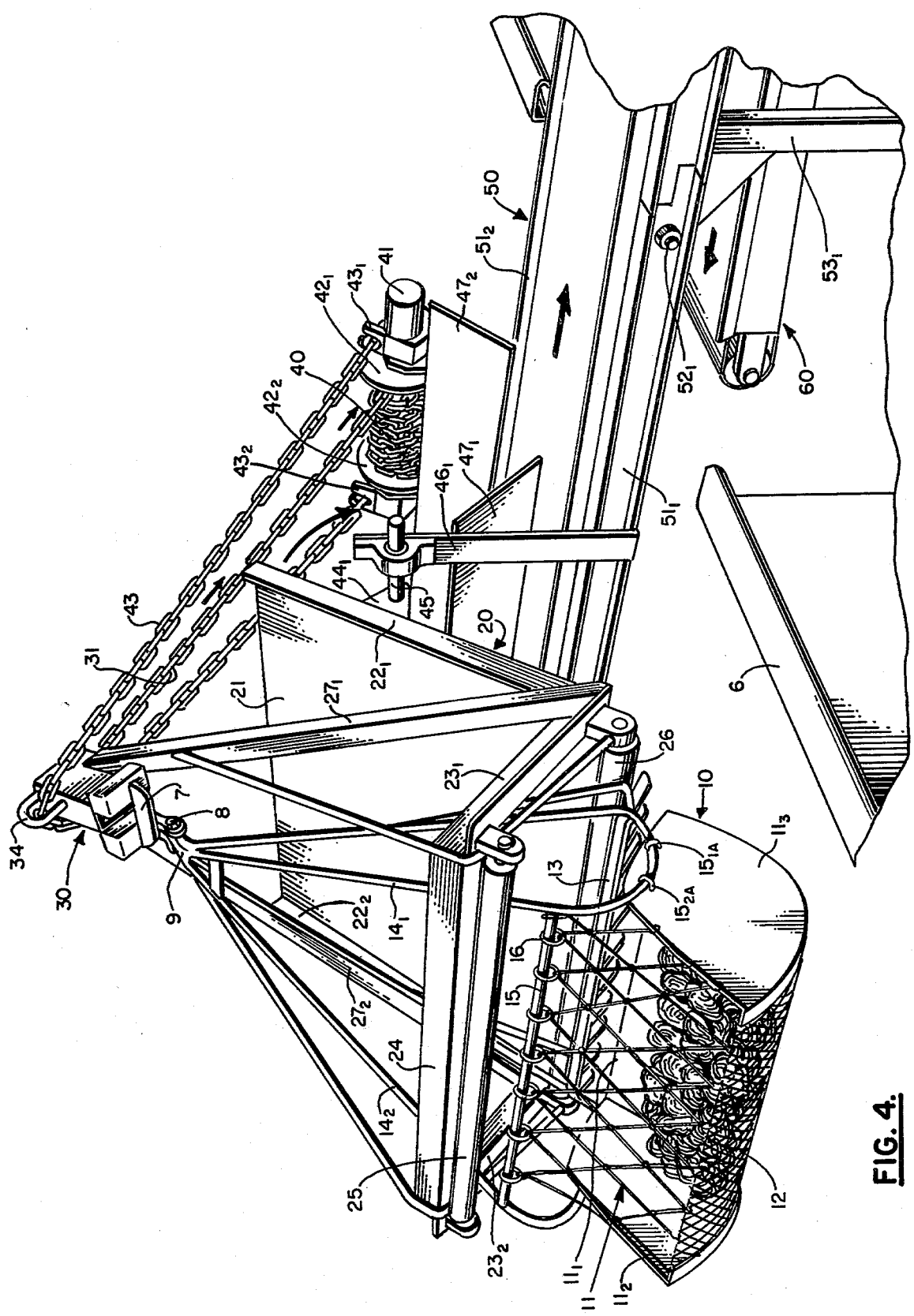
FIG. 4 is an isometric view of the oyster dredge, tilt or dumping mechanism, and conveyor systems, the section shown being pivotally mounted on the forward deck of the vessel in such manner that this portion of the dredge mechanism can be raised via a boom above the deck of the vessel.

A scoop, or dredge 10, as best shown by direct reference to FIG. 4, is constituted generally of an oblong iron, or metal frame inclusive of a portion over which a bag net can be attached, and a draw bar by virtue of which the dredge can be towed, drawn or dragged along the water bottom. Specifically, the dredge 10 includes a basket 11, the bottom $11_1$ and sides $11_2$, $11_3$ of which are constituted of solid metal panels, the rear and upper sections of which are covered with a metal gauze, mesh, or net 12, and the lower front portion of which is provided with a lip 13 having a plurality of substantially evenly spaced, downwardly projecting teeth, or teeth-like projections which bite into the soil as the dredge 10 is dragged along the water bottom to dig, scoop, pick up and cast oysters into the basket 11. The scoop, or dredge 10 per se, characterized in the figure also includes a tongue, bridle or draw member 14 constituted of an elongated frame by means of which the scoop or dredge 10 can be towed. The frame 14 includes a pair of alternately disposed, elongated, tear shaped metal hoops or loop members $14_1$, $14_2$, the larger curved ends of which are passed through eye bolts $15_{1A}15_{2A}$ and $15_{1B}$, $15_{2B}$ (not shown) secured within the external face of side panels $11_3$ and $11_2$, respectively, of the basket 11, while the opposite converging ends of the loop members $14_1$, $14_2$ are fused, or joined together and pivotally connected to hinged via a shank 9 to an eye bolt or clevis 32 to which a chain 31 can be connected for towing the scoop or dredge 10. A transverse laterally projected bar, or rod 15, located between the upper sides of metal hoop members $14_1$, $14_2$ provides rigidity and support for the frame 14, and also serves as a means to which the upper side of the wire net 12 can be secured, as by passage of the bar or rod 15 through the plurality of several rings 16 (i.e., $16_1$ through $16_n$) which are attached to and form a part of the wire net 12.

In lift position, as just prior to the dumping of the oysters also best shown by reference to FIG. 4, the dredge 10 is lifted, pulled into and fitted within a tiltable frame or tilt frame 20, which constitutes an essential part of the automatic oyster dumping mechanism. The tilt frame 20 includes a cage portion comprised generally of a flat floor plate 21, each side of which is provided with side rails or panels $22_1$, $22_2$, forming in effect a channel member of fairly heavy gauge metal; parallel aligned vertically oriented front posts $23_1$, $23_2$ constituted of heavy gauge metal of square or V-shaped cross-section; an upper horizontally aligned metal of square or V-shaped cross-section 24 which interconnects with vertical posts $23_1$, $23_2$; and, the front of the cage includes a pair of horizontally oriented, parallel aligned front mounted rolls 25,26 which facilitate entry of the dredge 10 into, and release and removal of the dredge 10 from the cage of the tilt frame. The tilt frame 20 also includes a pair of alternately disposed heavy angle iron bars $27_1$, $27_2$ one end of which connects with the lower corners of the cage where the vertical front posts $23_1$, $23_2$ are adjoined to the rails or side panels $22_1$, $22_2$ of floor plate 21 and the other ends are converged inwardly and effectively adjoined to pulley box 30.

Figure 2:
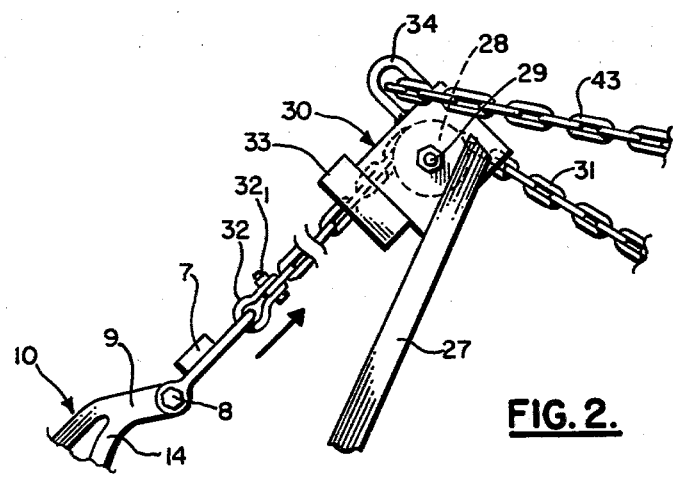
FIG. 2 depicts a partial right elevation view of the dredge lift mechanism of the preceding figure.

The pulley box 30, shown in some detail by reference to FIG. 2, is constituted of a housing formed by spaced-apart, relatively thick vertical metal side walls partially closed and rigidly spaced apart by top and bottom walls, a sheave or pulley 28 being mounted on a shaft 29 supported and journaled within the side walls of the housing. The sheave, or pulley 28 is a wheel grooved on its periphery to accommodate the chain 31 one end of which is wound around the barrel of a windlass 40, and the other of which is affixed by means of a clevis 32, or U-shaped piece of metal, the ends of which are perforated and fitted with a bolt or pin $32_1$, to the draw bar portion of the dredge 10. The dredge 10, it will be observed for example by reference to FIGS. 2 and 4, is affixed to the clevis 32 via a metal bar or arm 33 which is pivotally connected to the enlarged projecting portion, or shank 9 of dredge 10 via a hinge 8. A stop 7, constituted of a horizontally aligned bar, prevents withdrawal of the clevis 32 into the pulley box 30, continued motion being prevented by the stop 7 impinging and resting against the vertically notched block 33 at such time when the dredge 10 is withdrawn, or raised by the chain 31 to its uppermost position.

The chain 31, which is used for lowering, lifting and dumping the dredge 10, is passed through the pulley box 28 and one of its ends is secured to the clevis 32, while the opposite end thereof is wound about the barrel of the windlass 40, which is powered by means of a motor 41 which can be driven electrically or by fuel combustion. The wound end of chain 31 to prevent entanglement is maintained upon the barrel of the windlass between the confines of plates $42_1$, $42_2$. A second independently mounted chain 43 is employed as a bridle, and for support of tilt frame 20. It is secured via an end to one side of an axis of the windlass 40 and its opposite end, after passage through eye 34 located on the top wall of the pulley box 30 is attached to the axis on the opposite side of windlass 40, the chain 43 acting as a bridle to maintain the alignment of the tilt frame 20, and to support it in an angular position best suited for the release and retrieval of the dredge 10. Slotted guide members $43_1$, $43_2$ aid in maintaining the alignment of the tilt frame 20.

The tilt frame 20 is pivotally mounted above the conveyor 50 via perforated ears, or projections $44_1$, $44_2$ (not shown) which extend downwardly from the floor plate 21, through which a bar or axle 45 is passed; the bar or axle 45 being journalled with the upper portion of vertical posts $46_1$, $46_2$ (not shown) which are directly affixed to girder 51, which is one of a pair of parallelly aligned metal girders $51_1$, $51_2$ which extend from the center outwardly across the deck of the vessel and over the water, girders 51 providing the principle support for a continuous conveyor belt. The windlass 40 is secured upon girder $51_2$, the girder opposite girder $51_1$. Plate $47_1$, affixed to girder $51_1$, and plate $47_2$ affixed to girder $51_2$, are angularly disposed above the conveyor 50 to facilitate the discharge of oysters from dredge 10 onto the conveyor 50.

In the operation of dredge 10, from the time of its release from the cage of tilt frame 20 until it is pulled out of the water, with its load, back into the cage of tilt frame 20 it is controlled by chain 31, which is actuated by windlass 40. At the time the dredge 10 is released, while it is in the water, and at the time of lift until it begins to re-enter the cage of the tilt frame 20, the weight of the dredge 10 and the preselected length of chain 43 maintains the desired angular disposition of the tilt frame 20 to facilitate its operation; the desired orientation generally being one wherein the surface of the floor plate defines a line having an angle of inclination ranging from about 30° to about 60°, preferably from about 40° to about 50° from horizontal. At the time the loaded dredge 10 is pulled back into the cage of tilt frame 20, however, its weight causes an imbalance of the tilt frame 20, and both the tilt frame and dredge 10 are rotated rearwardly to dump the load of oysters from the dredge 10 between guide plate $47_1$, $47_2$ onto conveyor 50 for transport of the oysters.

Preferably, both girders $51_1$, $51_2$ are provided with alternately disposed hinges $52_1$, $52_2$, respectively, located very close to the deck edge of the vessel by virtue of which the entire dredge 10-tilt frame 20 mechanism, and the portion of the conveyor 50 which extends over the edge of the deck can be lifted or raised to an upright position, and secured, as by the derrick 70 when dredging operations have been suspended and the ship is underway. This is conveniently accomplished by attaching the hook 71 of derrick 70 within the eye 34 at the top of pulley box 30 and cranking the mechanism upwardly via use of the winch 72. The non-hinged, fixed portion of the conveyor 50 is maintained in position by the support posts $53_1$, $53_2$ (not shown).

The conveyor 60 is movably mounted on wheels 61 below the conveyor 50, and designed such that one end can be positioned below the space between conveyors 50,50', while the other end can be directed to virtually any point on an arc defined by the length of conveyor 60 radially moved, or moved with its opposite end in fixed position below the space between conveyors 50,50'. The construction of conveyor 60 is essentially like that of conveyors 50,50' in that it is comprised of metal girders $61_1$, $61_2$ between which rollers are mounted for support of an endless or continuous belt which can be driven via a suitable motor means for transporting oysters discharged from conveyors 50,50' to a location on the deck of the vessel, or for discharge of unselected material overboard. With the conveyor 50 in lifted position, and conveyor 60 repositioned, the missing movable section of the guard rail 6 through which conveyors 50,60 are extended can be replaced for loading the deck of the vessel.

In operation of the dredging apparatus 100, the vessel V having reached a dredging location, the dredges 10,10'-tilt mechanisms 20,$20_1$, respectively, are lowered from a raised position via use of derrick 70 and positioned over the water by lowering the hinged ends of conveyors 50,50', the dredges 10,10' are then dropped to the water bottom and dragged by the forward movement of the vessel. After the dredges 10,10' are filled, they are lifted to the surface for obtaining the oysters recovered from the water bottom. For convenience, only the operation of the dredge 10-tilt frame 20 will be described since, as earlier indicated, its operation is the same as that of dredge 10'-tilt frame 20' and other similiar mechanisms, if desired, operated off the same vessel, not shown. Referring to FIGS. 1 through 3, the dredge 10 is shown just as the lift is initiated, the dredge 10 having been filled by dragging it along the water bottom. Thus, the motor 41 of windlass 40 is energized and chain 31 is drawn in, and the chain is wrapped about the barrel of the windlass 40. The lifting of the dredge 10 is continued until the draw frame portion of the dredge, aided by the aligning action of tilt frame 20, and the buffeting action of rollers 25,26 located on tilt frame 20, begins to move into the cage portion of the tilt frame 20. As the stop 7 of the dredge 10 comes into contact with the notched metal bar or arm 33, the ascent of the dredge 10 is halted, at which time the forward side of the tilt frame 20 begins to tilt downwardly as shown by reference to FIG. 4, such action terminating, as best shown by reference to FIG. 5, in the dumping of the oysters from the basket 11, the oysters being carried under the action of gravity across the floor plate 21 where they are dumped between the guide plates 47$_1$, 47$_2$ onto the continuous belt of conveyor 50 where they are transported, the desired oysters are sorted out by operatives (not shown) who stand on deck beside the conveyor 50, and the undesired oysters or other specimens transferred to conveyor 60 and discarded back into the water.

Figure 6:
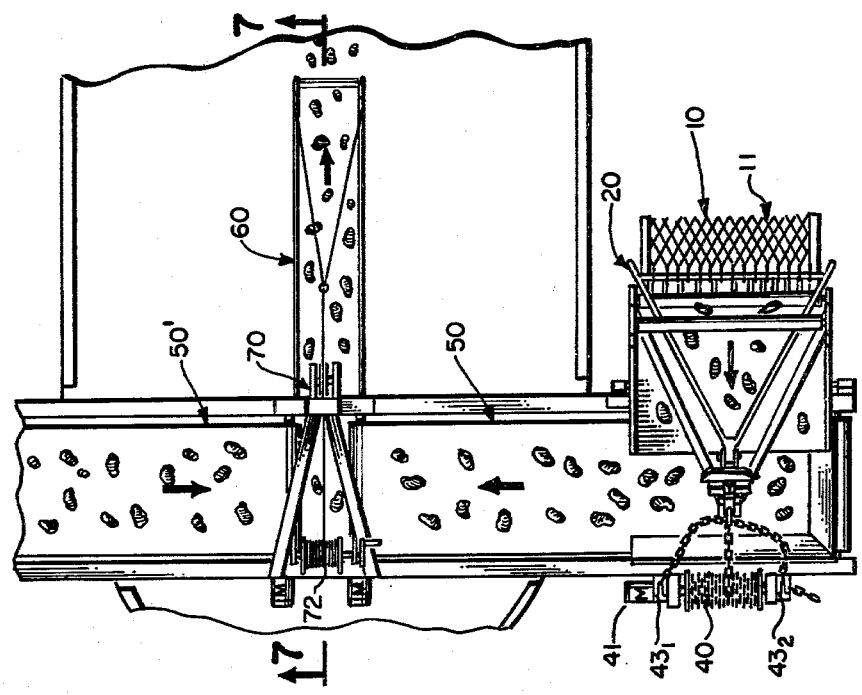
FIG. 6 depicts a plan view of the conveyor belts in operation at the time the oysters are discharged from the dredges.
Figure 7:
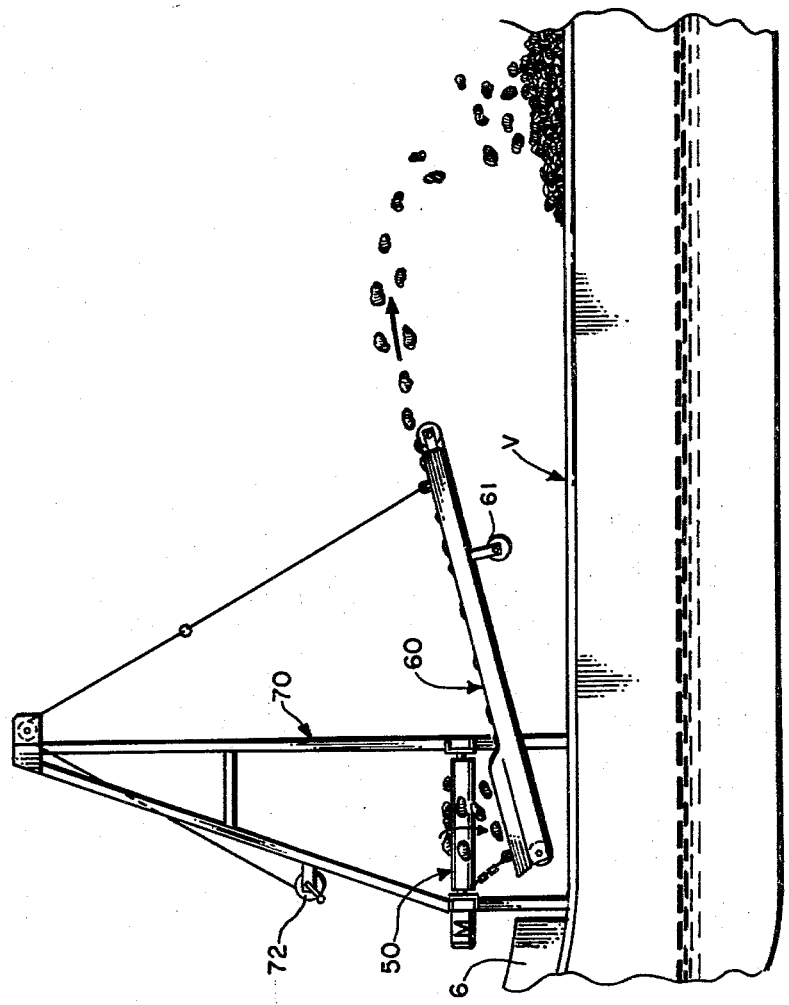
FIG. 7 is a side elevation view taken along section 7—7 of FIG. 6.

In other operations, the total of the contents of dredges 10,10' can be brought abroad the vessel, dumped onto the conveyors 50,50', transported by the conveyors 50,50' to the center of the vessel and then transferred onto conveyor 60 which can be employed to pile the oysters for later separation, assortment, grading and storage. Thus, referring to FIGS. 6 and 7 there is illustrated an operation such as may be practiced by a single operative who both pilots the vessel and operates the dredging apparatus 100. In this operation, the hook 71 of derrick 70 is employed to hoist an end of the conveyor 60, rotate its discharge end away from the water and toward an area of the deck, and retain the discharge end in a slightly elevated position while the opposite end of conveyor 60 is located under the oyster discharge ends of conveyors 50,50'. In such position, oysters dumped onto conveyors 50,50' are conveyed to the discharge ends thereof near the center of the deck, discharged onto the rearward end of conveyor 60, carried by the continuous belt of conveyor 60 to the discharge end of conveyor 60 and projected onto a pile on the deck.

It is appparent that various changes, such as in the shape, absolute or relative dimensions of the parts, materials used, and the like, as well as in the particular sequence of operation can be made without departing the spirit and scope of the invention, as will be apparent to those skilled in the art.

Having described the invention, what is claimed is:

1. Apparatus for mounting on the deck of a motor vessel, useful for dredging oysters and other marine animals from water bottoms, which is comprised of a dredge characterized as a container, permanently open at the front and provided with a forward draw member by virtue of which it can be attached to a chain, dragged along a water bottom by the motor vessel with open end forward, and filled with oysters scooped up from the water bottom, a tilt frame with an open cage, and floor plate with a pulley box mounted thereon, said pulley box being operatively communicated with a windlass having a barrel on which one end of a chain can be wound and the other of which can be passed through said pulley box and attached to the draw member of said dredge so that the dredge, when filled, can be raised from the water bottom and pulled into said cage and onto the floor plate of said tilt frame by operation of the windlass, a conveyor mounted on the deck of the vessel below said tilt frame such that, as the chain moves the dredge to a rearward position of rest on the floor plate of the cage, the tilt frame can be pivoted rearwardly by the weight of the filled dredge, and pull on the chain to discharge the oyster contents of the dredge onto the conveyor so that the oysters can be transported to a location on the deck of the vessel for separation, assortment, grading and collection, and after discharge of the oysters the pull on the chain can be relaxed to allow retilting of the tilt frame to its original position and return of the dredge to the water bottom for refilling with oysters.

2. The apparatus of claim 1 wherein the dredge is constituted of an oblong metal frame inclusive of a floor plate, metal side walls and a metal net which encloses the rearward and upper sides of said metal frame, and the draw member is constituted of a plurality of members converging forwardly to provide a shank to which a hinged arm is attached, and on the forward end of which is provided a clevis to which an end of the chain extending from the tilt frame can be attached.

3. The apparatus of claim 1 wherein conveyor is formed of a continuous belt mounted on rolls extending across a parallelly oriented pair of girders, and the tilt frame and windlass are mounted on the conveyor.

4. The apparatus of claim 3 wherein a portion of the conveyor extends outwardly beyond the deck of the vessel, and the tilt frame is mounted on that portion of the conveyor which extends beyond the deck of the vessel.

5. The apparatus of claim 1 wherein the conveyor is formed of a continuous belt mounted on rolls extending across a parallelly oriented pair of girders, the girders extend beyond the edge of the deck of the vessel and are hinged at a location near the edge of the deck of the vessel to provide an end portion which is pivotally connected to a fixed portion of the conveyor and can be lifted over the deck, and the tilt frame is pivotally mounted upon the portion of the conveyor which extends beyond the edge of the deck, and can be raised over the deck of the vessel.

6. Apparatus for mounting on the deck of a motor vessel, useful for dredging oysters and other marine animals from water bottoms, which is comprised of a dredge characterized as a container, open at the front and provided with a forward draw member by virtue of which it can be attached to a chain, dragged along a water bottom by the motor vessel with open end forward, and filled with oysters scooped up from the water bottom, a tilt frame constituted of a cage with floor plate, and a pulley box mounted thereon, within which the dredge can be withdrawn, the cage being formed by said floor plate, vertical and horizontal posts, and diagonal bars which converge inwardly from the face of the cage where the dredge enters therein to the rear, converging upon and being connected to said pulley box through which said chain from a windlass is passed so that the dredge, when filled, can be raised from the water bottom and pulled onto the floor plate of said tilt frame by operation of the windlass, a conveyor mounted on the deck of the vessel below said tilt frame such that, as the chain moves the dredge to a rearward position of rest on the floor plate, the tilt frame can be pivoted rearwardly to discharge the oyster contents of the dredge onto the conveyor so that the oysters can be transported to a location on the deck of the vessel for separation, assortment, grading and collection.

7. Apparatus for mounting on the deck of a motor vessel, useful for dredging oysters and other marine animals from water bottoms, which is comprised of a dredge comprising an oblong metal frame inclusive of a metal floor plate, metal side walls and a metal net which encloses the rearward and upper sides of said metal frame, and a draw member attached to the forward end of said metal frame, said draw member being constituted of a plurality of members converging forwardly and providing a shank to which a hinged arm provided with a clevis is attached, a tilt frame comprising a cage within which said dredge can be withdrawn, the cage being formed by a floor plate, vertical and horizontal posts, and diagonal bars which converge inwardly from a front opening within the cage wherein the dredge can enter therein to the rear, converging upon and being connected to a pulley box through which a chain can be passed, one end of said chain being wound on the barrel of a windlass, passed through the pulley box and attachable to the clevis at the forward end of the shank of said dredge so that the dredge can be drawn through the front opening of the cage to rest on the floor plate thereof, a conveyor formed of a continuous belt mounted on the deck of the vessel, the conveyor being formed of rolls extending across a parallelly oriented pair of girders, the tilt frame and windlass being mounted on the conveyor such that, as the chain moves the dredge to a rearward position of rest on the floor plate within the cage of the tilt frame, the tilt frame can be pivoted rearwardly to discharge the oyster contents of the dredge onto the conveyor so that the oysters can be transported to a location on the deck of the vessel for separation, assortment, grading and collection.

8. The apparatus of claim 7 wherein the open side of the cage of the tilt frame is provided with rollers to facilitate entry of the dredge into said tilt frame.

9. The apparatus claim 7 wherein a portion of the conveyor extends outwardly beyond the deck of the vessel, and the tilt frame is mounted on that portion of the conveyor which extends beyond the deck of the vessel.

10. The apparatus of claim 7 wherein the girders extend beyond the deck of the vessel and hinged at a location near the edge of the deck of the vessel to provide an end portion which is pivotally connected to a fixed portion of the conveyor and can be lifted over the deck, and the tilt frame is pivotally mounted upon the portion of the conveyor which extends beyond the edge of the deck can be raised over the deck of the vessel.

* * * * *